Feb. 10, 1942.    F. J. HERBELIN    2,272,521
BAND TYING DEVICE
Filed March 28, 1939    2 Sheets-Sheet 1
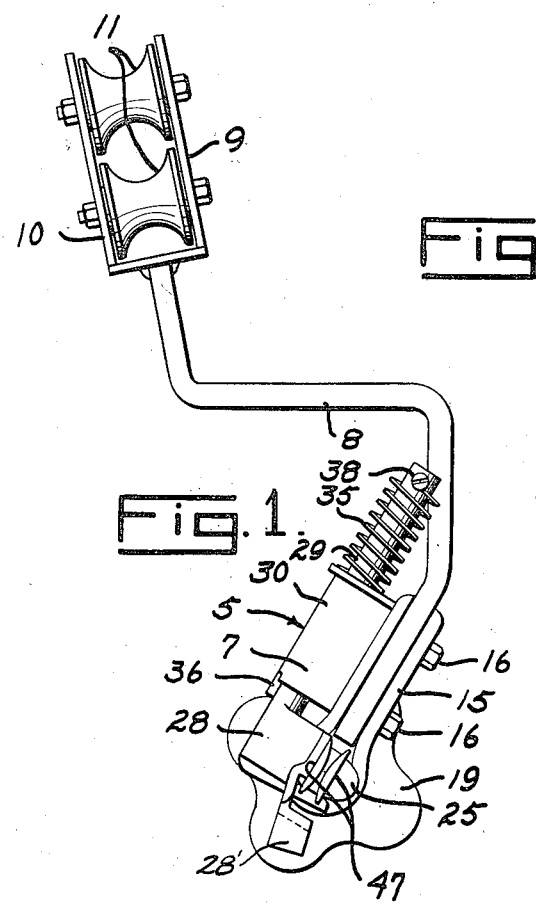
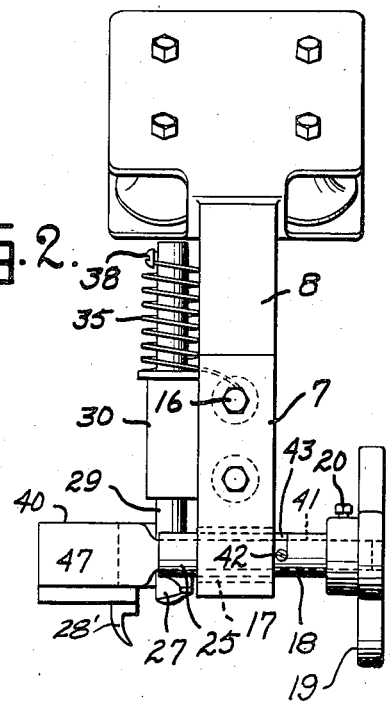
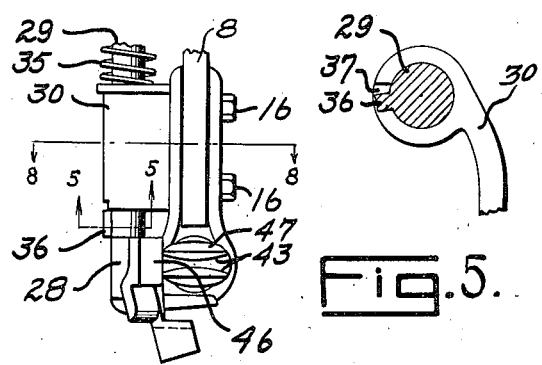
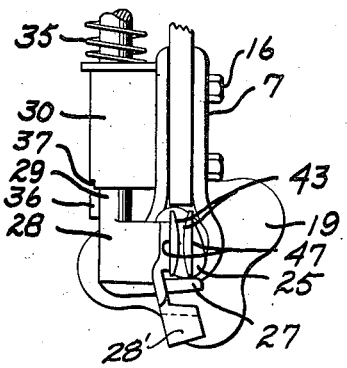
INVENTOR.
FRANCIS J. HERBELIN
Jesse R. Stone
&
Lester B. Clark
ATTORNEYS Feb. 10, 1942.  F. J. HERBELIN  2,272,521
BAND TYING DEVICE
Filed March 28, 1939  2 Sheets-Sheet 2

INVENTOR.
FRANCIS J. HERBELIN
Jesse R. Stone
Lester B. Clark
ATTORNEYS

Patented Feb. 10, 1942

2,272,521

UNITED STATES PATENT OFFICE 2,272,521

BAND TYING DEVICE

Francis J. Herbelin, Galveston, Tex.

Application March 28, 1939, Serial No. 264,531

3 Claims. (Cl. 100—15)

The invention relates to a bale tying device and more particularly to a device for holding one end of a bale encircling metal band or wire and mechanically bending the other or free end of such band to form a closed tie about the bale.

In securing cotton, wool and the like material into bales it is usual to form the bales under pressure and to pass metal bands therearound to hold the material under compression, such bands being secured or tied by manually bending the end thereof after such end is passed through a buckle or other connecting device. Such manner of tying is relatively slow and at best is injurious to the hands of the operator. Particularly is this true where the end to be tied is short and is therefore difficult to grasp and bend.

It is the general object of the invention to provide a simple and effective bale band tying device whereby injury to the hands of the operator is avoided, the speed of tying is increased and a uniform and efficient tie is produced.

Another object is to provide a tying device that will hold the socket or buckle end of the tie while the free end, or the end to be tied is inserted through such socket or buckle and is thereafter tied.

Still another object is to provide a tying device which may be moved parallel to the face of the bale being tied so that a band in any position along the bale may be tied thereby.

Another object is to provide a tying device which will effectively bend or tie the end of the tie member whether such end be short or long.

Another object is to provide a tying device which is of particular utility in securing ends of bale ties on which the socket or buckle is made an integral part of the tie.

Other objects and advantages of the device of the invention will be made apparent thru the following description taken in connection with the drawings in which:

Fig. 1 is a side elevation of a construction embodying the invention.

Fig. 2 is a front elevational view taken from the right of Fig. 1.

Fig. 3 is a view of the tying head showing the relation of parts when the actuating member has been turned a part of a revolution to release the clamping member for opening preliminary to the clamping of the band thereon.

Fig. 4 is a view similar to that shown in Fig. 3 but in which the clamping member is moved to open position.

Fig. 5 is a sectional view taken on line 5—5 in Fig. 4.

Figure 9:
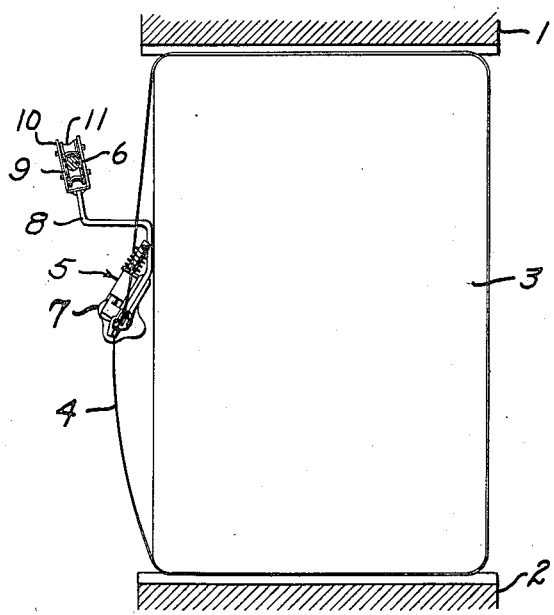
Fig. 9 is an assembly view illustrating the relative position of the device to a press and the material confined thereby.

An embodiment of the invention is illustrated in the drawings and is shown generally in Fig. 9 as used with a press having platens 1 and 2 to compress to a high density a bale 3 about which a plurality of tie members 4 are placed. The tying device generally indicated as 5 or a plurality of such devices are supported upon a suitable guiding or supporting rod 6, the tying head 7 being attached to the lower end of an arm 8 having welded thereto at its opposite end, a supporting head 9 shown as a yoke 10 welded to the arm 8 and provided with support rollers 11 surrounding the rod 6. In the construction thus generally defined it is believed apparent that the tying device 5 may be swung upwardly away from the bale 3 and may be moved longitudinally thereof to any desired position. Such freedom of movement is also instrumental in releasing the tying device from the tie or band 4 when the tying operation is completed, as will be more fully described.

The tying device 5 comprises a head member 15 which is secured to the arm 8 by means of bolts 16 and has a bushing 17 (Fig. 8) to receive a sleeve 18 to which the hand wheel 19 or other suitable driving mechanism is secured by means of set screw 20. The opposite end of the sleeve 18 is provided with cam projections 25 adapted to engage an arm 27 projecting outwardly from an L-shaped clamp member 28 having rod 29 extending upwardly therefrom and passing thru bearing 30 attached to the head member 15. The upper end of the rod 29 is surrounded by a compression spring 35 which is instrumental in holding the clamp member 28 upwardly so that the lug 36 on the rod 29 is normally held within a recess 37 in the lower end of the bearing 30. This lug and recess construction locks the clamp member against rotation when the buckle end of a tie is clamped by the clamp member and while the free end of the tie is threaded through the buckle preliminary to tying as will more fully appear.

As illustrated in Fig. 2 the lower end of the spring 35 is attached to the bolt 16 while the upper end of the spring is secured to the rod 29 by means of a screw 38. The spring 35 therefore serves also as a torsion spring which tends to rotate the clamp member 28 in a counter-clockwise direction as viewed in Fig. 8. A combination clamping and tying member 40 is provided with a shaft portion 41 which projects into the sleeve 18 and is secured therein by means of the pin 42 within the slot 43 in the sleeve 18.

The opposite end of the member 40 has outwardly facing surfacs 47 which are adapted to cooperate with the inner surface 46 of the clamping member 28 to hold one end of the tie under the torsional force exerted by spring 35. This end of the member 40 is bifurcated and has arcuate inner surfaces 43 to receive the free end of the tie member for tying.

Attention is directed to the fact that a loose connection between the sleeve 18 and the member 40 is provided through the pin 42 and the slot 43. Hence initial rotation of the hand wheel 19 will cause the clamp member 28 to be moved downwardly under the influence of one of the cam surfaces engaging the arm 27. The pin 42 will then have reached the opposite end of the slot 43 whereupon further rotation of the hand wheel 19 will drive the member 40 which will rotate the clamping member 28 within the bushing 30 against the torsional force exerted by the spring 35.

Figure 8:
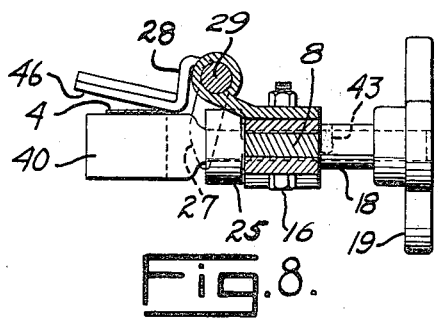
Fig. 8 is a sectional view taken on line 8—8 of Fig. 4.

The clamp member 22 will then have assumed the position shown in Fig. 8 and the upper or buckle end of the tie 4 may be placed within the opening between the members 28 and 40. The inward movement of the buckle end of the tie is determined by a downward projection 28' on the clamp member 28. This projection presents an outwardly facing surface against which the tie is placed to assume the position shown in Fig. 8. Further rotation of the hand wheel 19 permits the clamp member 28 to rotate to its initial position and hence to clamp the tie 4 between the surfaces 46 and 47. At the same time the spring 35 urges the clamp member 28 and rod 29 upwardly so that the lug 36 enters the recess 37 and hence locks the clamp member against rotation as the free end of the tie 4 is threaded through the buckle 12 as already explained.

The free end of the tie 4 is then inserted thru the buckle 12 which is held adjacent the tying head 5 in the manner just described. As this free end passes thru the buckle 12 it enters the opening between the bifurcations on the end of the member 40 and is pushed therethrough such a distance that the tie is brought into close relationship with the surface of the bale 3 as illustrated in Figs. 6 and 9.

Figure 6:
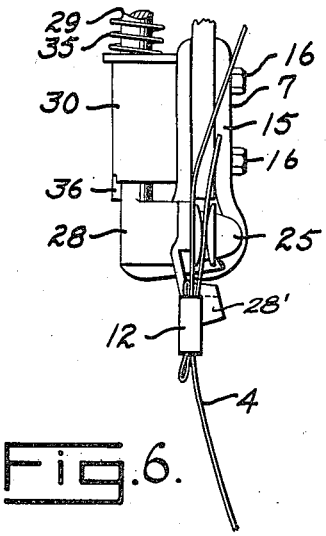
Fig. 6 is a view showing a band in place preliminary to the tying operation.
Figure 7:
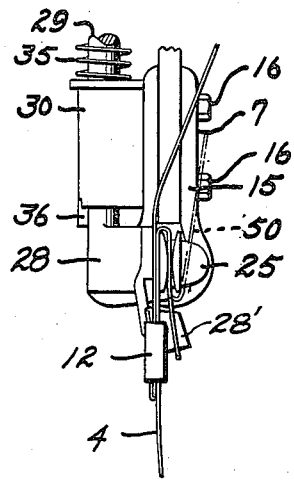
Fig. 7 is a view similar to that shown in Fig. 6 showing the completed tie.

The hand wheel 19 is then rotated in a clockwise direction as viewed in Figs. 6 and 7. Again the initial rotation of the hand wheel will cause the clamping member 28 to be moved downwardly so that such member may rotate within the bearing 30 against the torsional force exerted by the spring 35. Such rotation will take place by virtue of rotation of the member 40 which at the same time exerts a bending effort upon the free end of the tie. When the hand wheel 19 has rotated through an angle of 180° the end of the tie assumes the position shown in Fig. 7.

It is apparent that the free end of the tie may be readily bent in the manner just described even though such end be relatively short. If, on the other hand the free end of the tie is long, the tying operation will form a double or S-shaped bend, as indicated in dotted outline as 50 in Fig. 7. The tying device 5 is moved transversely of the band 4 when the tying operation is completed, hence releasing the engagement of the tying device with the band. When the plates 1 and 2 are slightly withdrawn the expansion of the bale 3 will apply tension to the band 4, whereby the objective of the tying operation is achieved.

The operation of the device of the invention as just described is believed apparent. By way of summary it will be assumed that a bale is prepared for tying and that the tying device is in the relative position to the bale as shown in Fig. 9. The hand wheel 19 is turned to move the clamping member 28 to the position shown in Fig. 4. The buckle end of the tie 4 is positioned with the portion of the tie proximate the buckle 12 in position to be clamped between the face 46 of clamp 28 and one of the faces 47 on the clamping and tying member 40. When such clamping takes place, upon further rotation of the wheel 19, the combination compression and torsion spring 35 moves the clamp member 28 upwardly so that lug 36 enters recess 37 to restrain the clamp member from rotation while the free end of the tie 4 is inserted through the buckle 12 and between the bifurcations of the member 40.

After the free end of the tie is threaded through the buckle 12 and the member 40, as indicated in Fig. 6, the hand wheel 19 is then rotated through 180°. Initial rotation of the wheel causes the cam 25 to engage arm 27 and move the clamp member 28 downwardly so that such member is free to rotate about the axis of rod 29 during the remainder of the angle of rotation of the wheel 19. The resulting rotation of the member 40 produces the reverse bend as shown in Fig. 7. Thereafter the material of the bale 3 is permitted to expand against the closed tie whereupon the tying mechanism may be moved sidewardly for complete release from the tie.

The tie 4 and buckle 12 may be of any conventional construction and the particular type of tie and buckle form no part of the present invention. I prefer however to use an integral bale tie and socket such as that shown in Patent No. 1,969,109, issued August 7, 1934.

The objects and advantages of the invention are believed apparent from the foregoing description illustrating an embodiment of the invention and the mode of operation of such embodiment. Broadly, the invention comprehends a novel construction which facilitates the tying of bands about bales of compressible material, produces a more effective tie and eliminates the hazard of injury to the hands of the operator.

What is claimed is:

1. In combination a swingable clamping member and a rotatable clamping member having opposed clamping surfaces, said rotatable clamping member being bifurcated and adapted to swing the first mentioned member outwardly upon initial rotary movement whereby a tie member may be inserted therebetween, the bifurcated clamping member being adapted to receive the free end of the tie member and to form a reverse bend therein upon continued rotation of such member.

2. In a bale tying device the combination with a rotable bending member of a swingable clamping member adapted to swing outwardly upon initial movement of the rotatable member, whereby a bale tie may be inserted between said members, and means for moving the swingable clamping member into clamping engagement with the bale tie upon further movement of the rotatable member, said rotatable member being bifurcated to receive the free end of the bale tie and to form a reverse bend therein upon a continued half revolution of the member.

3. A bale tying device comprising in combination, a pair of clamping members for engaging one end of a bale tie therebetween, one of said members having spaced bifurcations to receive the free end of the tie in alined relation with the clamped end, and means for rotating the said bifurcated member to reversely bend said free end.

FRANCIS J. HERBELIN.